(12) United States Patent
Cobb et al.

(10) Patent No.: US 7,194,326 B2
(45) Date of Patent: Mar. 20, 2007

(54) METHODS AND SYSTEMS FOR LARGE-SCALE AIRFRAME ASSEMBLY

(75) Inventors: James M. Cobb, Burien, WA (US); Timothy G. Nielsen, Kent, WA (US); John W. Palmateer, Gig Harbor, WA (US); James A. DeLand, Bothell, WA (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 10/774,091

(22) Filed: Feb. 6, 2004

(65) Prior Publication Data

US 2005/0172470 A1  Aug. 11, 2005

(51) Int. Cl.
*G06F 19/00* (2006.01)

(52) U.S. Cl. ..................................... 700/114
(58) Field of Classification Search ............ 700/28–31, 700/56–64, 112–114
See application file for complete search history.

(56) References Cited

U.S. PATENT DOCUMENTS

| | | | |
|---|---|---|---|
| 4,471,448 A * | 9/1984 | Williams ................ 356/139.04 |
| 4,578,747 A * | 3/1986 | Hideg et al. .................. 700/31 |
| 4,956,552 A | 9/1990 | Paramythioti |
| 5,005,277 A | 4/1991 | Uemura et al. |
| 5,117,348 A * | 5/1992 | Romero et al. ............... 700/57 |
| 5,168,453 A | 12/1992 | Nomaru et al. |
| 5,202,742 A | 4/1993 | Frank et al. |
| 5,203,073 A * | 4/1993 | Kotake et al. ................ 29/784 |
| 5,208,763 A * | 5/1993 | Hong et al. .................... 702/95 |
| 5,229,648 A | 7/1993 | Sues et al. |
| 5,266,955 A | 11/1993 | Izumi et al. |
| 5,506,584 A | 4/1996 | Boles |
| 5,589,835 A | 12/1996 | Gildea et al. |
| 5,627,511 A | 5/1997 | Takagi et al. |
| 5,724,124 A | 3/1998 | Kai |
| 6,088,663 A | 7/2000 | Wang |
| 6,122,520 A | 9/2000 | Want et al. |
| 6,452,668 B1 | 9/2002 | Pratt |
| 6,501,543 B2 | 12/2002 | Hedges et al. |
| 6,519,029 B1 | 2/2003 | Hedges et al. |
| 6,535,282 B2 | 3/2003 | Hedges et al. |
| 6,545,751 B2 | 4/2003 | Beliveau et al. |
| 6,618,133 B2 | 9/2003 | Hedges et al. |

(Continued)

FOREIGN PATENT DOCUMENTS

WO  WO 0045231  8/2000

*Primary Examiner*—M. N. Von Buhr
(74) *Attorney, Agent, or Firm*—Lee & Hayes, PLLC (57) ABSTRACT

Methods and systems for large-scale airframe assembly are disclosed. In one embodiment, a method includes measuring a plurality of discrete point positions at least one of on and adjacent to at least one of a first and a second component, and measuring at least one surface position on the at least one of the first and second components. The measured positions are compared with a desired position information (e.g., a computer aided design model). The comparison may include applying a fitting routine to the measured positions and the desired position information. Next, a transformation matrix for improving the comparison between the measured positions and the desired position information is computed. At least one of the first and second components is then moved according to the transformation matrix. During movement, the plurality of discrete point positions may be monitored and provided to the position control system by a feedback loop.

51 Claims, 3 Drawing Sheets

U.S. PATENT DOCUMENTS

| | | |
|---|---|---|
| 6,621,565 B2 | 9/2003 | Pratt et al. |
| 6,630,993 B1 | 10/2003 | Hedges et al. |
| 6,662,103 B1 | 12/2003 | Skolnick et al. |
| 6,827,678 B1 * | 12/2004 | Kumpel ............... 493/34 |
| 6,892,160 B2 * | 5/2005 | Gooch et al. ............ 702/150 |
| 6,971,175 B2 * | 12/2005 | Savoy et al. ............ 29/897.2 |
| 2001/0049589 A1 * | 12/2001 | Yasuda et al. ............ 702/150 |
| 2006/0107508 A1 * | 5/2006 | Bonse et al. ............ 29/407.1 |
| 2006/0137164 A1 * | 6/2006 | Kraus ............... 29/407.1 |

* cited by examiner

METHODS AND SYSTEMS FOR LARGE-SCALE AIRFRAME ASSEMBLY

FIELD OF THE INVENTION

The present disclosure relates to methods and systems for performing position measurements during large-scale airframe assembly, and more specifically, to methods and systems for performing position measurements utilizing integrated discrete positioning and surface mapping systems.

BACKGROUND OF THE INVENTION

Aircraft components are currently assembled in large holding tools or fixtures. Such tools are substantially rigid and are usually fixed to a factory floor. The holding tools support the aircraft components and provide limited movement capability to slide components together. In large-scale airframe assembly, it is typically assumed that if the holding tool is in the correct position, then the point on the aircraft component where the tool touches or supports the aircraft component will be known, and hence all coordinates on the component are known, and thus, the airframe assembly is correct and the aircraft will meet its aerodynamic requirements.

To ensure proper assembly of the aircraft components, the holding tools typically require periodic measurements (surveying) to ensure that the holding tool is in proper alignment for its specialized task. For example, the airframe support and alignment tools are typically measured for proper position prior to loading of an airframe component. Once the tool measurements are taken and analyzed as within tolerance, the large tooling structures are loaded with the aircraft components and used to move and align said aircraft components. It is presumed that if the holding tools meet their alignment requirements that the aircraft components will also meet design alignment requirements.

Although desirable results have been achieved using such prior art methods, there is room for improvement. For example, large components may deviate from their nominal design due to their complexity and non-uniform material properties. Although a holding tool may be perfect, the assumptions for the component it holds may deviate slightly, though within design specifications, from nominal. These abnormalities may slightly reduce fuel efficiency and may increase manufacturing flow time if trim needs to be corrected. In addition, in many assembly situations measurement technologies are not available to verify that the above-noted assumptions are correct as early in the assembly process as desirable to make needed corrections. Existing measurement technologies are often too expensive or overly intrusive to the assembly process to adequately address this issue. Furthermore, because of the cost and unique design of each holding tool, changes to the aircraft that require tool modifications are typically quite expensive and time consuming. Therefore, novel methods and systems that non-intrusively and economically provide measurements during various stages of the large-scale airframe assembly process would be highly useful.

SUMMARY OF THE INVENTION

The present invention is directed to methods and systems for performing position measurements during large-scale airframe assembly. Embodiments of methods and systems in accordance with the invention may advantageously provide measurements during various stages of the large-scale airframe assembly process in a non-intrusive, economical manner, and may improve the overall accuracy and efficiency of the assembly process.

In one embodiment, a method of assembling two components includes measuring a plurality of discrete point positions at least one of on and adjacent to at least one of the two components, and measuring the surface position of at least one of the two components. When measurements are complete, both components will have been measured with at least one of the two measurement systems. Next, the measured positions of the at least one surface and the plurality of discrete points, provided discrete points are in engineering defined positions, are compared with a desired position information (e.g., a computer aided design aka CAD model) for both components. In a particular embodiment, the comparison includes applying a fitting routine to the measured positions and the desired position information. Next, a transformation matrix for improving the comparison between the measured positions and the desired position information is computed. At least one of the two components may then be moved according to the transformation matrix. During movement, the plurality of discrete point positions may be monitored and provided to the position control system by a feedback loop.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and systems for performing position measurements during aircraft assembly, including large-scale airframe assembly. Many specific details of certain embodiments of the invention are set forth in the following description and in FIGS. 1–3 to provide a thorough understanding of such embodiments. One skilled in the art, however, will understand that the present invention may have additional embodiments, particularly combinations of discrete and surface measurements, and that the present invention may be practiced without several of the details described in the following description.

Generally speaking, embodiments of methods and systems in accordance with the present invention may advantageously reduce or eliminate the need for large, fixed holding tools during the assembly of various components of large structures, including the assembly of large aircraft. In one embodiment, an assembly process of a large structure includes measuring the positions of a plurality of discrete points (e.g., three points) on a component of the structure using a first measurement system, and measuring a random sample of positions on a surface of the same component using a second measurement system. The first and second measurement systems may operate simultaneously or sequentially. The measured position data (both discrete point positions and sample surface position) may then be compared with a model of the large structure that includes a desired or "as-designed" position of the component. In a particular embodiment of the invention, the large structure may be an aircraft, and the desired position of the component may be provided by a three-dimensional Computer Aided Design (CAD) aerodynamic model of the aircraft.

A "best fit" routine may be then applied to the measured position data and the model of the large structure, and a transformation matrix may be determined for moving the component in a manner that provides the "best fit" between the measured (or "as-built") shape of the component and the desired position of the component. The transformation matrix may be provided to a position control system that, in turn, moves the component into the "best fit" with the desired position. During movement of the component into the "best fit" position, the first measurement system may periodically or continuously be operated to monitor the position and movement of at least one of the discrete points, and may provide the measured discrete point positions back to the position control system as feedback, allowing the position control system to operate in a feedback controlled manner. Embodiments of methods and systems in accordance with the present invention may provide significant advantages over the prior art, as described more fully below.

Figure 1:
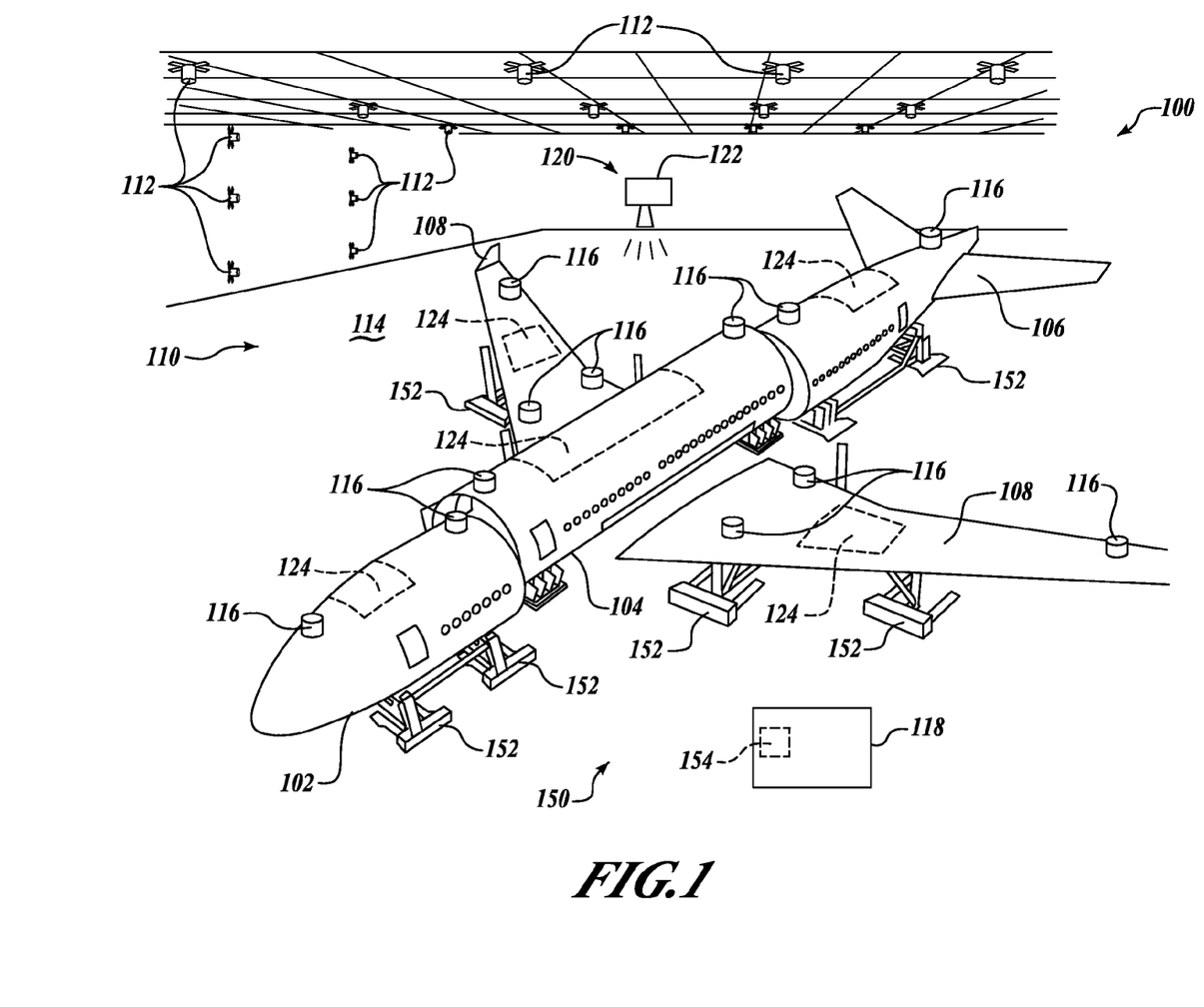
FIG. 1 is an isometric view of a plurality of disassembled aircraft components in a manufacturing facility in accordance with an embodiment of the present invention.
Figure 2:
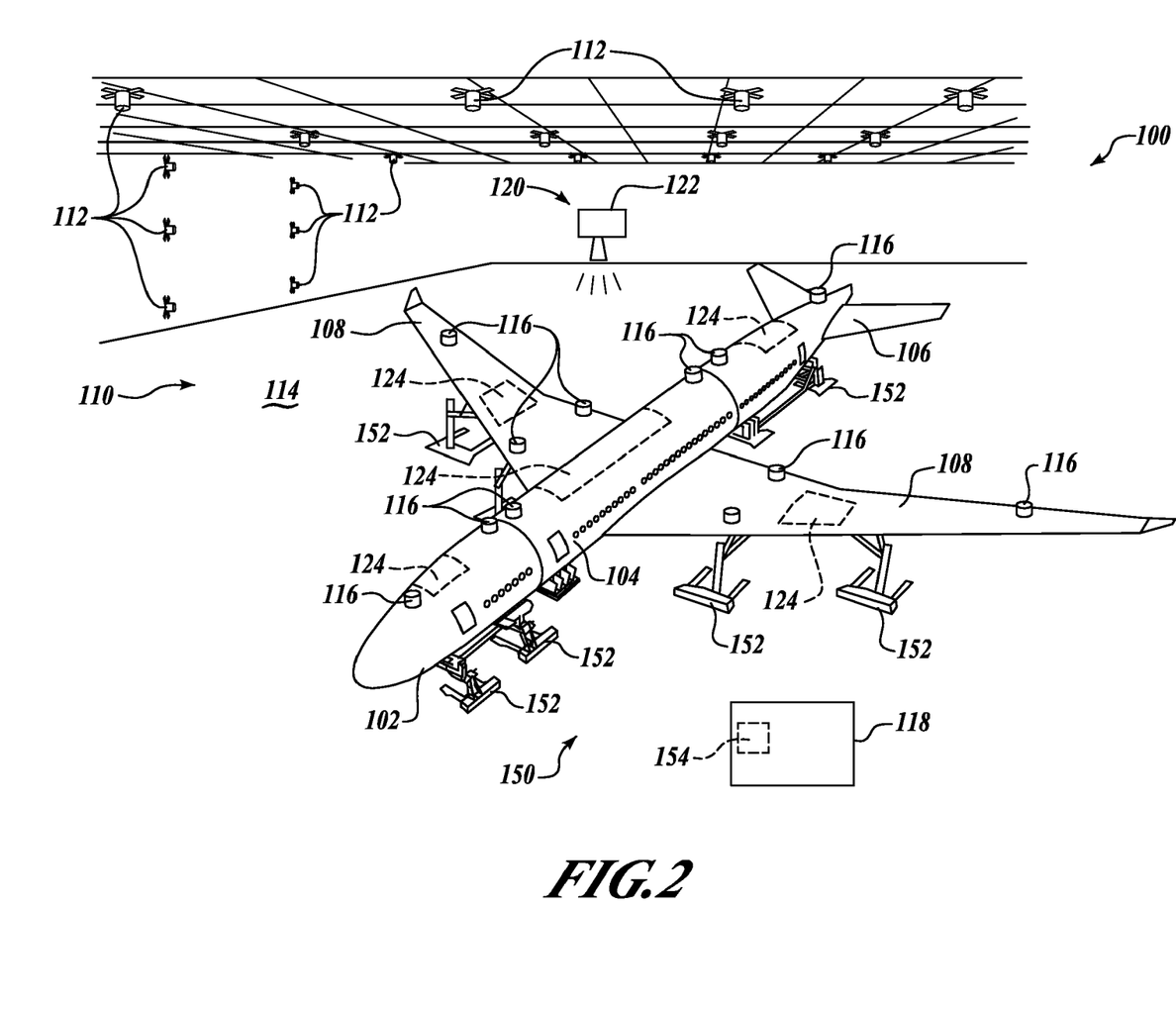
FIG. 2 is an isometric view of the aircraft components of FIG. 1 in an assembled position.

FIG. 1 is an isometric view of a plurality of disassembled aircraft components in a manufacturing facility 100 (e.g., a hangar, an assembly line building, etc.) in accordance with an embodiment of the invention. FIG. 2 is an isometric view of the aircraft components of FIG. 1 in an assembled position. As shown in FIG. 1, in this embodiment, the aircraft components include a forward fuselage assembly 102, a mid-fuselage assembly 104, a tail assembly 106, and a pair of wing assemblies 108. The manufacturing facility 100 includes a first position measurement system 110 having a plurality of transmitters 112 distributed about a working space 114, and a plurality of sensors 116 located on the surfaces of the various components 102, 104, 106, 108. The transmitters 112 and the sensors 116 are operatively coupled to a data management computer 118 by wires, cables, or wireless coupling members (not shown).

In one embodiment, the first position measurement system 110 may be a relatively-rapid, parallel data collection system that may be used to track positions of specific (or discrete) points of interest on or adjacent to one or more of the components 102, 104, 106, 108. A minimum criterion for locating the sensors 116 is that they will move relative to motion of the components 102, 104, 106, 108 that they are adjacent to. An example of target placement is shown in FIG. 1, the first position measurement system 110 could track three points (or sensors 116) on each upper surface of the wing assemblies 108 and two points (or sensors 116) on the mid-fuselage assembly 104 to which the wing assemblies 108 are to be attached. Thus, as described more fully below, the first position measurement system 110 could monitor the positions of both the wing assemblies 108 and the mid-fuselage 104 during the assembly process.

In one representative embodiment, the first position measurement system 110 may be an infrared global positioning system (IRGPS), including those systems generally disclosed, for example, in U.S. Pat. No. 5,589,835 issued to Gildea et al., U.S. Pat. No. 6,452,668 B1, issued to Pratt, and U.S. Pat. Nos. 6,501,543 B2, 6,535,282 B2, 6,618,133 B2, and 6,630,993 B1 issued to Hedges et al, which patents are incorporated herein by reference. Such IRGPS systems are commercially-available from, for example, ArcSecond, Inc. of Dulles, Va. Alternately, the first position measuring system 110 may be a laser-based point tracking system of the type commercially-available from Automated Precision, Inc. of Rockville, Md., or any other suitable type of discrete point tracking system.

With continued reference to FIG. 1, the manufacturing facility 100 further includes a second surface measurement system 120 having a transmitter/receiver unit 122 operatively coupled to the data management computer 118 (e.g. by wires, cables, or wireless connectors). In this embodiment, the second surface measurement system 120 is positioned above the aircraft components 102, 104, 106, 108 and is adapted to measure at least a sampled portion 124 of the outer surfaces of each of the components. The second surface measurement system 120 may be a relatively-slow serial data collection system that may be used to 'scan' the outer surfaces of the various aircraft components to collect surface position data. These data may then be compared against the as-designed aircraft data to verify how well the assembled aircraft components conform to the aerodynamic design contours.

In one embodiment, for example, the second surface measurement system 120 may be a laser radar system of the type generally disclosed, for example, in U.S. Pat. No. 4,824,251 issued to Slotwinski et al., U.S. Pat. No. 5,988,862 issued to Kacyra et al, U.S. Pat. No. 5,202,742 issued to Frank et al., U.S. Pat. No. 5,266,955 issued to Izumi et al., and U.S. Pat. No. 5,724,124 issued to Kai, which patents are incorporated herein by reference. More specifically, examples of the second position measurement system 120 may be a laser radar-based scanning system, such as the Cyrax laser radar system, commercially-available from Cyra Technologies, Inc. of San Ramon, Calif., or a laser radar scanning system of the type commercially-available from Mensi, Inc. of Alpharetta, Ga., or the laser radar systems, including the LR200 laser radar system, commercially-available from Leica Geosystems, Inc. of Heerbrugg, Switzerland.

It will be appreciated that the surface measurement system 120 may be a structured light measurement system of the type generally disclosed, for example, in U.S. Pat. No. 6,031,612 issued to Shirley et al. More specifically, examples of the second surface measurement system 120 may be a structured light measurement system, such as the Accordion Fringe Scanner commercially-available from Dimensional Photonics of Southborough, Mass.

It will be appreciated that manufacturing facilities in accordance with the present invention may be utilized to assemble a wide variety of aircraft, and that the invention is not limited to the particular embodiment of manufacturing facility 100, or to the assembly of the particular aircraft embodiment, shown in FIGS. 1 and 2. For example, while the aircraft shown in the accompanying figures is generally representative of a commercial passenger aircraft, including, for example, the 737, 747, 757, 767, and 777 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

It will also be appreciated that manufacturing facilities having first and second measurement systems in accordance with the teachings of the invention may be used to assemble a wide variety of other products. For example, embodiments of apparatus and methods in accordance with the invention may be employed in the manufacture of automobiles, recreational vehicles, ships, buildings, and virtually any other products that require the accurate assembly of components.

Figure 3:
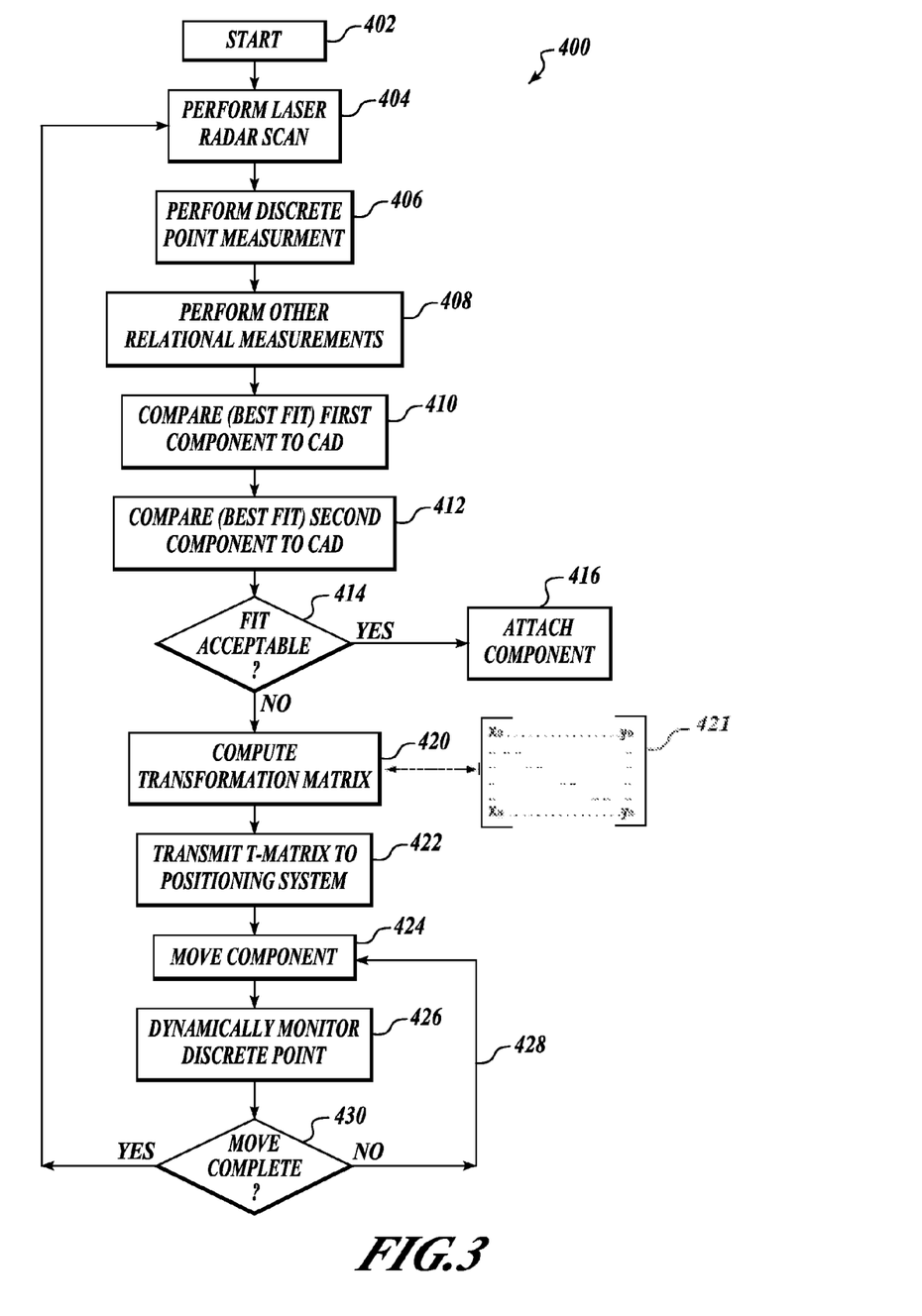
FIG. 3 is a flow chart of a method of manufacturing an aircraft in accordance with another embodiment of the present invention.

FIG. 3 is a flow chart showing a method 400 of manufacturing an aircraft in accordance with an embodiment of the present invention. The method 400 begins at a block 402. At a block 404, the second surface measurement system 120 (or laser radar system) is operated to perform a scan of one or more of the sampling surfaces 124 on the components 102, 104, 106, 108. Similarly, at a block 406, the first position measurement system 110 is operated to perform measurements of the positions of a plurality of discrete points (or sensors) 116 at least one of on or adjacent to the components 102, 104, 106, 108. In alternate embodiments, the first and second position measurement systems 110, 120 may be operated simultaneously rather than sequentially as shown in FIG. 3. At a block 408, any other desired measurements, including measurements of gaps, edge margin, and other conventional types of measurements, may be performed. In general, the order of operation between blocks 404, 406, and 408 is not important.

The measured position data for the first component, including the measured positions of the one or more sampling surfaces 124 and the discrete points 116, are compared with an "as-designed" model of the aircraft, including an "as-designed" position of one or more of the aircraft components at a block 410. In one embodiment, the desired positions of the one or more components may be provided by a three-dimensional CAD aerodynamic model of the aircraft. At a block 410, all of the measurement data may be transformed into a coordinate system compatible with the CAD model of the first component. A "best fit" routine may be then applied to the measured position data and the "as-designed" model of the second component at a block 412. The "best fit" routine (block 412) may be any suitable surface-fitting routine, including, for example, those particular surface-fitting routines that depend on Gaussian surface-fitting criteria, Chebyshev fitting criteria, or any other suitable fitting criteria. Examples of commercially-available fitting routines include those offered by New River Kinematics of Williamsburg, Va., Raindrop GeoMagic of Research Triangle Park, N.C., and Verisurf of Anaheim, Calif.

It will be appreciated that any of the fitting criteria can be weighted such that certain regions of the measured surface will be assigned more importance than other regions. For example, the leading edge of a wing 108 may be weighted so that its fit is improved at the expense of a poorer fit at the trailing edge.

It will also be appreciated that any of the fitting criteria may be constrained by other measurements 408 such as gap and edge margin. Such constraints may limit the "best fit" of components one and two.

As further shown in FIG. 3, the method 400 further includes evaluating whether the position of the one or more components is acceptable at a block 414. If so, then the method 400 proceeds with attachment of the one or more components together at a block 416. The attachment of the components may be performed in the conventional manner, such as by positioning scaffolds or other structures about the aircraft, and applying rivets, screws, welding, or other suitable attachment methods to attach the components together. After attachment of the components (block 416), the method 400 may continue to the performance of any other desired actions, including, for example, returning to block 402 and repeating the method 400 for another aircraft component, or proceeding with other actions involved in the manufacturing process, or even terminating the method 400.

If it is determined at block 414, however, that the position of the one or more components is not acceptable (e.g., misaligned, not within desired tolerances, etc.), then at a block 420, a transformation matrix is computed based on the "best fit" routine 412 for controllably moving the component to an acceptable position within a set "as-designed" requirements (e.g. functional alignment, within tolerance limits, etc.) between the measured position of the component and the desired position of the component. For example, in one embodiment, the transformation matrix 421 is a set of instructions for controllably moving the component through three-dimensional space, including rotation about each of the three axes, to an acceptable position within the set of "as-designed" requirements. The methods and systems for computing the transformation matrix are well-known and widely-published in the relevant art.

At a block 422, the transformation matrix is provided to a position control system 150 (FIG. 1). The position control system 150 then moves the component into the "best fit" with the desired position in accordance with the transformation matrix at a block 424. In one representative embodiment, the position control system 150 includes a plurality of automated or semi-automated lifting devices 152 operatively coupled to a controller 154, wherein the lifting devices 152 are adapted to support and move the components in accordance with command signals from the controller 154. As shown in FIG. 1, the controller 154 may be integrated within the data management computer 118. Known position control systems suitable for use with the subject invention include those systems commercially-available from Advanced Integrated Technology of Plano, Tex., Nichols Engineering of Kent, Wash., and Electroimpact of Mukilteo, Wash.

It will be appreciated that some embodiments of position control systems 150 may include one or more lifting devices 152 that operate in accordance with their own coordinate systems. Therefore, when the transformation matrix is transmitted to the position control system 150, it may be necessary for one or more additional conversions (or transformations) to be performed by the controller 154 to properly control the movement of the lifting devices 152 or other components or portions of the position control system 150. Conventional methods of performing such conversions include, for example, using a) previously performed measurements and compensations relating the discrete measurement points to the lifting device 152, which in turn generates the necessary conversion matrix, and b) computing the conversion matrix in real time by making blind incremental moves which are measured and analyzed with the discrete point measurement system generating the conversion matrix. Other possible methods of performing the necessary conversions within the position control system 150 are possible. For purposes of the method 400 shown in FIG. 3, such conversions may be included, for example, in the transmittal of the transformation matrix to the position control system at the block 422.

Either simultaneously or sequentially with the movement of the component into the "best fit" position (block 424), the first position measurement system 110 may be operated to monitor the position and movement of one or more of the discrete points (either periodically or continuously) at a block 426. The position information acquired during the movement of the component (block 426) may be fed back into the position control system 150 by a feedback loop 428, allowing the position control system 150 to operate in a feedback-controlled manner. Finally, the method 400 may return to block 404 to repeat the actions performed in blocks 404 through 428 until the fit between the "as-built" (or actual) position and the "as-designed" position of the one or more components is determined to be acceptable at the block 414.

Of course, a variety of alternate embodiments of methods in accordance with the present invention may be conceived, and the invention is not limited to the particular embodiment described above and shown in FIG. 3. It will be understood, for example, that in alternate embodiments of methods in accordance with the invention, various combinations of discrete and surface measurements may be performed. For embodiments of methods that include performing a surface measurement on only one of two components being coupled together, it is preferred that the surface measurement be performed on the component that is believed to be the more critical component in terms of the necessary positioning accuracy. In one particular embodiment, for example, if a wing assembly is being coupled with a fuselage, it may be preferable to measure a position of a surface on the wing assembly rather than on the fuselage to ensure a more accurate match of the position of the wing assembly with the aerodynamic model. Of course, in alternate embodiments, surface measurements may be made on both the fuselage and wing assembly, or on the fuselage alone. Furthermore, it may be preferable that the measurements (discrete points and position measurements) be performed at locations that may be directly compared with associated measurements on the design model in order for the comparisons with the design model to be accomplished without need for extrapolation or other actions that may degrade accuracy of the comparison.

Embodiments of methods and systems in accordance with the invention may advantageously improve the process of manufacturing large structures, including aircraft. The first and second position measurement systems allow the components of the aircraft to be aligned, and aerodynamic conformity to be verified, while aircraft assembly is taking place. Embodiments of the invention further allow automated assembly of large aircraft components by providing the measurement portion of an assembly control system feedback loop. By measuring the aircraft parts directly instead of a fixed tool structure, the tool becomes merely non-critical support structure for the part. The measurement system becomes the tool, directly traceable (known information flow with no human intervention) to the original design specifications.

Furthermore, embodiments of the present invention may advantageously reduce or eliminate the need for rigid holding tools to support the components of the aircraft during the assembly process. By providing first and second measurement systems that can measure discrete and aerodynamic surface points simultaneously, the surface data can be tied to the discrete part assembly point data to provide motion control feedback to an automated position control system adapted to align and join aircraft components together. Furthermore, the surface and discrete point data of the "as-built" component may be compared with the "as-designed" model of the aircraft, and the "as-built" component may be moved throughout any of the six degrees of freedom (i.e., x-y-z translated, pitched, rolled, yawed) to provide a "best fit" between the "as-built" component and the "as-designed" model. Thus, the resulting assembled aircraft may be more accurately assembled, and may provide improved aerodynamic performance, in comparison with aircraft assembled in accordance with prior art assembly processes.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of assembling first and second components, comprising:
    measuring at least one of a first surface position and a first plurality of discrete point positions associated with the first component, the first plurality of discrete point positions being at least one of on and adjacent to the first component;
    measuring at least one of a second surface position and a second plurality of discrete point positions associated with the second component, the second plurality of discrete point positions being at least one of on and adjacent to the second component;
    comparing the measurements associated with at least one of the first and second components with a desired position information;
    computing a transformation matrix for moving at least one the first and second component to provide substantial design conformity between the measurements and the desired position information; and
    moving at least one of the first and second components according to the transformation matrix.

2. The method of claim 1, wherein measuring the measurements associated with the first component and measuring the measurements associated with the second component includes simultaneously measuring the measurements associated with the first and second components.

3. The method of claim 1, wherein measuring at least one of a first surface position and a first plurality of discrete point positions associated with the first component includes measuring a first plurality of discrete point positions on the first component.

4. The method of claim 1, wherein measuring at least one of a first surface position and a first plurality of discrete point positions associated with the first component includes measuring the first plurality of discrete point positions adjacent to the first component.

5. The method of claim 1, wherein measuring at least one of a first surface position and a first plurality of discrete point positions associated with the first component, and measuring at least one of a second surface position and a second plurality of discrete point positions associated with the second component includes measuring surface positions on both the first and second components.

6. The method of claim 1, wherein measuring at least one of a first surface position and a first plurality of discrete point positions associated with the first component includes measuring the first plurality of discrete point positions using at least one of a global positioning system, an infrared global positioning system, and a laser-based point tracking system.

7. The method of claim 1, wherein measuring at least one of a first surface position and a first plurality of discrete point positions associated with the first component includes measuring the first surface position using at least one of a radar system, structured light measurement system, and a scanning system.

8. The method of claim 1, wherein comparing the measured positions of the at least one surface position and the plurality of discrete point positions with a desired position information of the at least one of the first and second components includes comparing the measured positions with a computer-aided design model.

9. The method of claim 1, wherein comparing the measured positions of the at least one surface position and the plurality of discrete point positions with a desired position information includes applying a fitting routine to the measured positions and the desired position information.

10. The method of claim 9, wherein the fitting routine includes at least one of a weighted fitting criteria, an unweighted fitting criteria, a Gaussian fitting criteria, and a Chebyshev fitting criteria.

11. The method of claim 1, wherein comparing the measured positions of the at least one surface position and the plurality of discrete point positions with a desired position information includes evaluating whether the measured positions are substantially close to the desired position information.

12. The method of claim 11, wherein evaluating whether the measured positions are substantially close includes evaluating whether the measured positions are within at least one of a tolerance limit and substantial alignment.

13. The method of claim 1, wherein computing a transformation matrix for moving at least one of the first and second component to provide substantial design conformity between the measured positions and the desired position information includes computing at least one secondary transformation matrix for moving at least one of the first and second components into a final position.

14. The method of claim 1, wherein computing a transformation matrix for moving at least one of the first and second component to provide substantial design conformity between the measured positions and the desired position information includes computing a first transformation matrix for moving at least one of the first and second components into a first intermediate position, and computing a second transformation matrix for moving the at least one of the first and second components into a final position.

15. The method of claim 1, wherein moving at least one of the first and second components according to the transformation matrix includes re-measuring the plurality of discrete point positions on said moved first and second components.

16. The method of claim 1, wherein moving at least one of the first and second components according to the transformation matrix includes transmitting the transformation matrix to an at least partially automated position control system, the position control system being configured to move the at least one of the first and second components in accordance with the transformation matrix.

17. The method of claim 16, wherein moving at least one of the first and second components according to the transformation matrix includes re-measuring the plurality of discrete point positions on the at least one of the first and second components, and providing the re-measured positions of the plurality of discrete points in a feedback loop to the position control system.

18. A method of assembling first and second components of an aircraft, comprising:
positioning the first component in a desired position;
positioning the second component proximate the first component;
measuring at least one of a first surface position and a first plurality of discrete point positions associated with the first component, the first plurality of discrete point positions being at least one of on and adjacent to the first component;
measuring at least one of a second surface position and a second plurality of discrete point positions associated with the second component, the second plurality of discrete point positions being at least one on and adjacent to the second component;
comparing the measurements associated with at least one of the first and second components with a desired position information;
computing a transformation matrix for moving at least one of the first and second component to provide substantial design conformity between the first and second components and the desired position information of the second component; and
moving the second component relative to the first component in accordance with the transformation matrix.

19. The method of claim 18, wherein measuring at least one of a first surface position and a first plurality of discrete point positions associated with the first component includes measuring discrete point positions on the first component.

20. The method of claim 18, wherein measuring at least one of a first surface position and a first plurality of discrete point positions associated with the first component includes measuring the first surface position on the first component.

21. The method of claim 18, wherein measuring at least one of a first surface position and a first plurality of discrete point positions associated with the first component, and measuring a second surface position on the second component includes simultaneously measuring surface positions on both the first and second components.

22. The method of claim 18, wherein measuring at least one of a first surface position and a first plurality of discrete point positions associated with the first component includes measuring the first plurality of discrete point positions using at least one of a global positioning system, an infrared global positioning system, and a laser-based point tracking system.

23. The method of claim 19, wherein measuring at least one of a first surface position and a first plurality of discrete point positions associated with the first component includes measuring the first surface position using at least one of a radar system, structured light measurement system, and a scanning system.

24. The method of claim 18, wherein comparing the measurements associated with at least one of the first and second components with a desired position information includes comparing the measured positions with a computer-aided design model.

25. The method of claim 18, wherein comparing the measurements associated with at least one of the first and second components with a desired position information includes applying a fitting routine to the measured positions and the desired position information.

26. The method of claim 18, wherein comparing the measurements associated with at least one of the first and second components with a desired position information includes comparing the measurements associated with the second component with a desired position information for the second surface.

27. The method of claim 26, wherein comparing the measurements associated with the second component with a desired position information for the second surface includes applying a fitting routine to the measured positions and the desired position information.

28. The method of claim 18, wherein moving the second component relative to the first component in accordance with the transformation matrix includes re-measuring the plurality of discrete point positions on the second component.

29. The method of claim 18, wherein moving the second component relative to the first component in accordance with the transformation matrix includes transmitting the transformation matrix to an at least partially automated position control system, the position control system being configured to move the second component relative to the first component in accordance with the transformation matrix.

30. The method of claim 29, wherein moving the second component relative to the first component in accordance with the transformation matrix includes re-measuring the plurality of discrete point positions on the second component, and providing the re-measured positions of the plurality of discrete points in a feedback loop to the position control system.

31. A system for positioning first and second components for assembly, comprising:
- a first measurement system configured to measure a plurality of discrete point positions associated with at least one of the first and second components, the discrete point positions being at least one of on and adjacent to the corresponding one of the first and second components;
- a second measurement system configured to measure at least one surface position on at least one of the first and second components;
- a data management device operatively coupled to the first and second measurement systems, the data management device including a processing portion configured to:
  - receive the measured positions of the plurality of discrete points and the at least one surface,
  - compare the measured positions with a desired position information of the at least one of the first and second components, and
  - compute a transformation matrix for moving at least one of the first and second component to provide substantial design conformity between the measured positions and the desired position information; and
- a position control system operatively coupled to the data management device and configured to move at least one of the first and second components according to the transformation matrix.

32. The system of claim 31, wherein the first and second measurement systems are further configured to operate simultaneously to measure the plurality of discrete point positions and the at least one surface position, respectively.

33. The system of claim 31, wherein the first measurement system includes at least one of a global positioning system, an infrared global positioning system, and a laser-based point tracking system.

34. The system of claim 31, wherein the second measurement system includes at least one of a radar system, a structure light measurement system, and a scanning system.

35. The system of claim 31, wherein the processing portion is further configured to compare the measured positions of the at least one surface position and the plurality of discrete point positions with a computer-aided design model.

36. The system of claim 31, wherein the processing portion is further configured to compare the measured positions of the at least one surface position and the plurality of discrete point positions with a desired position information by applying a fitting routine to the measured positions and the desired position information.

37. The system of claim 31, wherein the processing portion is further configured to compare the measured positions of the at least one surface position and the plurality of discrete point positions with a desired position information by evaluating whether the measured positions are substantially close to the desired position information.

38. The system of claim 31, wherein the processing portion is further configured to compute a transformation matrix for moving at least one of the first and second component to provide substantial design conformity between the measured positions and the desired position information by computing a transformation matrix for moving at least one of the first and second components into a final position.

39. The system of claim 31, wherein the first measurement system configured to measure a plurality of discrete point positions is further configured to re-measure the plurality of discrete point positions during movement of the at least one of the first and second components by the position control system.

40. The system of claim 31, wherein the position control system comprises an at least partially automated position control system, and wherein the first measurement system configured to measure a plurality of discrete point positions is further configured to re-measure the plurality of discrete point positions during movement of the at least one of the first and second components by the position control system, and to provide the re-measured positions of the plurality of discrete points in a feedback loop to the position control system.

41. A manufacturing facility for assembling first and second components of an aircraft, comprising:
- a working space configured to receive the first and second components;
- a first measurement system configured to measure a plurality of discrete point positions associated with at least one of the first and second components, the discrete point positions being at least one of on and adjacent to the corresponding one of the first and second components;
- a second measurement system configured to measure at least one surface position on at least one of the first and second components;
- a data management device operatively coupled to the first and second measurement systems, the data management device including a processing portion configured to:
  - receive the measured positions of the plurality of discrete point positions and the at least one surface position,
  - compare the measured positions with a desired position information of the at least one of the first and second components, and
  - compute a transformation matrix for moving at least one of the first and second component to provide substantial design conformity between the measured positions and the desired position information; and
- a position control system at least partially disposed within the working space and operatively coupled to the data management device, the position control system being configured to move at least one of the first and second components according to the transformation matrix.

42. The manufacturing facility of claim 41, wherein the working space comprises at least one of a hangar and an assembly-line building.

43. The manufacturing facility of claim 41, wherein the first measurement system is further configured to be operated simultaneously with the second measurement system.

44. The manufacturing facility of claim 41, wherein the first measurement system includes at least one of a global positioning system, an infrared global positioning system, and a laser-based point tracking system.

45. The manufacturing facility of claim 41, wherein the second measurement system includes at least one of a radar system, a structured light measurement system, and a scanning system.

46. The manufacturing facility of claim 41, wherein the processing portion is further configured to compare the measured positions of the at least one surface position and the plurality of discrete point positions with a computer-aided design model.

47. The manufacturing facility of claim 41, wherein the processing portion is further configured to compare the measured positions of the at least one surface position and the plurality of discrete point positions with a desired position information by applying a fitting routine to the measured positions and the desired position information.

48. The manufacturing facility of claim 41, wherein the processing portion is further configured to compare the measured positions of the at least one surface position and the plurality of discrete point positions with a desired position information by evaluating whether the measured positions are substantially close to the desired position information.

49. The manufacturing facility of claim 41, wherein the processing portion is further configured to compute a transformation matrix for moving at least one of the first and second component to provide substantial design conformity between the measured positions and the desired position information by computing a transformation matrix for moving at least one of the first and second components into a final position.

50. The manufacturing facility of claim 41, wherein the first position measurement position is further configured to re-measure the plurality of discrete point positions during movement of the at least one of the first and second components by the position control system.

51. The manufacturing facility of claim 41, wherein the position control system comprises an at least partially automated position control system, and wherein the first measurement system configured to measure a plurality of discrete point positions is further configured to re-measure the plurality of discrete point positions during movement of the at least one of the first and second components by the position control system, and to provide the re-measured positions of the plurality of discrete points in a feedback loop to the position control system.

* * * * *